April 27, 1965  R. A. HUNT  3,180,637
RECORD CARD FEEDING APPARATUS

Original Filed Nov. 28, 1958  9 Sheets-Sheet 1

FIG. 1

INVENTOR.
ROBERT A. HUNT
BY
ATTORNEY

April 27, 1965  R. A. HUNT  3,180,637
RECORD CARD FEEDING APPARATUS
Original Filed Nov. 28, 1958  9 Sheets-Sheet 2

FIG. 2

INVENTOR.
ROBERT A. HUNT
BY 
ATTORNEY

INVENTOR.
ROBERT A. HUNT
ATTORNEY

April 27, 1965 R. A. HUNT 3,180,637
RECORD CARD FEEDING APPARATUS

Original Filed Nov. 28, 1958 9 Sheets-Sheet 5

INVENTOR.
ROBERT A. HUNT
BY
ATTORNEY

April 27, 1965  R. A. HUNT  3,180,637
RECORD CARD FEEDING APPARATUS
Original Filed Nov. 28, 1958  9 Sheets-Sheet 6

INVENTOR.
ROBERT A. HUNT
BY
ATTORNEY

April 27, 1965 R. A. HUNT 3,180,637
RECORD CARD FEEDING APPARATUS
Original Filed Nov. 28, 1958 9 Sheets-Sheet 7

INVENTOR.
ROBERT A. HUNT
BY
ATTORNEY

April 27, 1965  R. A. HUNT  3,180,637
RECORD CARD FEEDING APPARATUS
Original Filed Nov. 28, 1958  9 Sheets-Sheet 8

FIG.12

INVENTOR.
ROBERT A. HUNT
BY
ATTORNEY

FIG.13

3,180,637
RECORD CARD FEEDING APPARATUS
Robert A. Hunt, Wilbraham, Mass., assignor to Xerox Corporation, Rochester, N.Y., a corporation of New York
Original application Nov. 28, 1958, Ser. No. 776,848. Divided and this application Dec. 14, 1961, Ser. No. 159,402
3 Claims. (Cl. 271—54)

This invention relates to improvements in automatic xerographic reproduction systems and, particularly, to improvements in systems of this type to facilitate the making of reproductions from microfilm. More specifically, this invention relates to record card handling apparatus and is a division of application S.N. 776,848, filed November 28, 1958, in the name of Robert A. Hunt, now abandoned.

In the process of xerography, for example, as disclosed in Carlson Patent 2,297,691, issued October 6, 1942, a xerographic plate comprising a layer of photoconductive insulating material on a conductive backing is given a uniform electric charge over its surface and is then exposed to the subject matter to be reproduced, usually by conventional projection techniques. This exposure discharges the plate areas in accordance with the light intensity that reaches them, and thereby creates an electrostatic latent image on or in the photoconductive layer. Development of the latent image is effected with an electrostatically charged, finely divided material, such as an electroscopic powder, which is brought into surface contact with the photoconductive layer and is held thereon electrostatically in a xerographic powder image pattern corresponding to the electrostatic latent image. Thereafter, the developed xerographic powder image is usually transferred to a support surface to which it may be fixed by any suitable means.

Since the disclosure in Carlson, many improvements have been made in xerographic devices and techniques, within the scope of the basic Carlson invention. As a result, both manual and automatic machines for carrying out xerographic reproduction processes are in wide commercial use. The present invention constitutes a further improvement in automatic xerographic processing systems whereby such systems may more readily be employed in integrated data processing systems, particularly those known as unitized data processing systems.

As is well known, in recent years, the steadily increasing size of various industries has required an enormous increase in the number and variety of business records that must be made, maintained, and be kept available for use. Prior to the advent of xerography, previously known conventional systems of record making and keeping were employed for this purpose. However, the increasing enormity of recording operations made this phase of a business increasingly expensive and burdensome to the point that it was becoming economically unfeasible to continue by conventional techniques.

As one facet of the record-keeping problem, the mere protection of the records of a business may be considered. As a safeguard against destruction of records by fire, flood, or other disaster, it became a common practice periodically to microfilm a concern's records and to store these microfilms at locations and under conditions to prevent their inadvertent destruction. Although this technique was effective to preserve the records for possible future reference, it merely added another expense to the record-keeping burden without, in any way, simplifying the handling or maintaining of records. This condition was inherent, first, since the primary purpose was to remove the microfilm records from everyday use and, second, because of the relative inaccessibility of selected records contained on such microfilm.

Recently, there has been developed an improved system for making microfilm records whereby such records may be maintained under conditions of relative security from destruction and, at the same time, be available for day-to-day use. This system is generally known as a "unitized" microfilm system and comprises the basic steps of (1) copying onto microfilm original drawings, tracings, memoranda, or other records likely to require reproduction at a later date, etc.; (2) mounting the individual microfilm frames into the apertures of microfilm data processing cards, which may be designated by coded perforations for use in conventional card-controlled machines; and (3) using such microfilm cards for the reproduction of the film information thereon.

A typical example of a microfilm card of the type contemplated herein is disclosed in Patents 2,511,859, 2,512,-106, and 2,587,022. As disclosed in these patents the microfilm card comprises a conventional record card of the type widely used in record-controlled accounting and tabulating systems, but is provided with an aperture with a depressed margin therein in which a microfilm frame may be inserted and permanently secured to the card. When a microfilm frame of data to be reproduced is so mounted in a microfilm card, the card may also be code punched with information defining, identifying, or relating to the microfilm picture. Thereafter, these cards may be manually or machine sorted and otherwise processed in accordance with conventional uses of such cards.

By the use of such "unitized" microfilm cards, it has been possible to effect substantial savings in the handling of microfilmed records. However, from the standpoint of reproduction of the card information, microfilm systems employing such cards were limited to conventional photographic projection techniques to reproduce the microfilm information. This involved cumbersome, costly, and time-consuming photographic developing techniques that detracted substantially from the overall efficiency of the system.

By means of the present invention it is possible to reproduce information from microfilm cards conveniently, economically, and at a rate of speed that contributes substantially to the utility and effectiveness of unitized microfilm systems. This is effected by means of an improved automatic xerographic processing system wherein microfilm cards may be fed seriatim to an optical scanning system and have their images projected onto the sensitized surface of a rotating xerographic drum after which an enlarged reproduction of the microfilm image is quickly and accurately transferred to a desired support surface.

The principal object of the invention is to improve automatic xerographic processing systems for use in unitized data processing systems. A further object of the invention is to improve automatic xerographic processing systems to facilitate the reproduction of copy from microfilm, particularly from microfilm cards. A further object of the invention is to improve card handling apparatus to enable compatible operation of microfilm cards with xerographic processing systems. A further object of the invention is to improve card handling apparatus to enable compatible operation of microfilm cards with xerographic processing systems, independently of the longitudinal dimension of the microfilm frame in the card.

These and other objects of the invention are attained by means of a card handling apparatus for feeding microfilm cards seriatim to a card carriage whereby they are transported past the optical axis of a projection system in timed relation to the movement of a sensitized xerographic plate whereby the image on the microfilm is effective to form an electrostatic latent image on the xerographic plate in an enlarged configuration of the microfilm image. Thereafter, the electrostatic latent image is developed by means of an improved cascade developing system to form a xerographic powder image of the microfilm image on the drum. In addition, a web feeding and tensioning device is arranged to present a web of transfer material into surface contact with the xerographic plate and the electrostatic force developed in the transfer of the xerographic powder image to the transfer material is effective electrostatically to tack the transfer material web to the plate surface to ensure synchronism of movement therewith. After image transfer, the transfer material web is passed through an improved fusing apparatus wherein the xerographic powder image is permanently affixed to the web. The invention also includes means for controlling the operation of the card handling apparatus whereby a predetermined number of reproductions of each microfilm card may be made, as required. Furthermore the card handling apparatus may be positioned relative to the axis of the optical system, as desired, whereby microfilm cards having different longitudinal dimensions may be processed without loss of time or waste of material.

A preferred form of the invention is shown in the accompanying drawings in which.

Throughout this description the front of the xerographic processing system (see FIG. 1) is regarded as that portion which the operator faces while placing microfilm cards in the machine for reproduction and while adjusting the several manual operating controls. The right and left ends of the machine are regarded as being to the right and left of the operator as he faces the machine.

Figure 1:
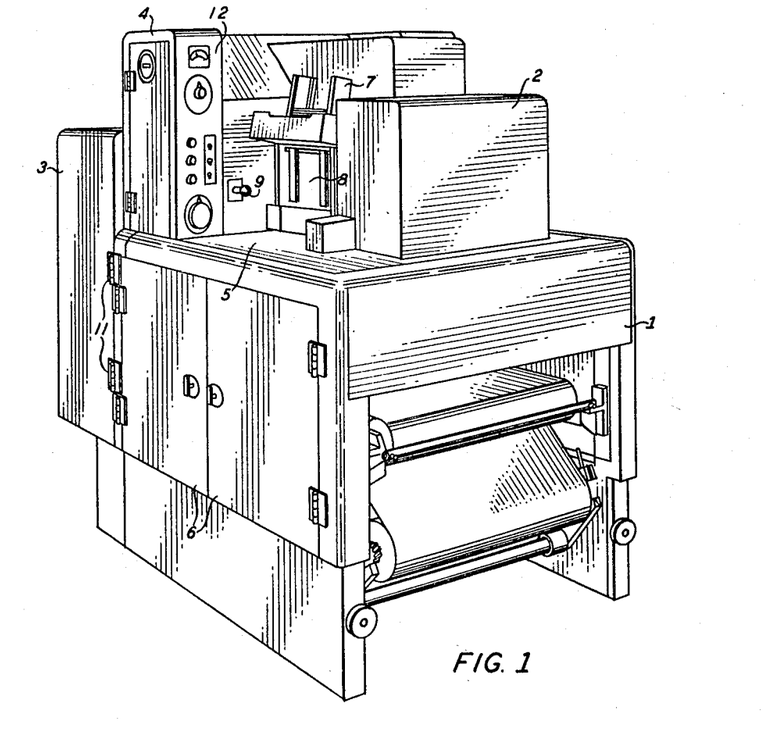
FIG. 1 is a perspective view of an automatic xerographic processing system containing the invention.

In the particular embodiment shown in the drawings, the invention is incorporated in a microfilm projection system that is a fully automatic, continuous printer for reproducing information contained on microfilm cards. This equipment reproduces copy on a continuous roll of paper, that may have a web of width up to 24″, from either positive or negative film, in either of two magnification ratios: 15× or 20×; whereby microfilm images of different sizes may conveniently be enlarged to the full width of the web. Referring to FIG. 1, the system may be considered to include four distinct sections for housing the several elements thereof, namely, a base section 1, for housing the xerographic drum, the web tensioning and feeding apparatus, as well as the devices for effecting the xerographic functions of plate charging, image transfer, brush cleaning, etc.; an upper section 2, for housing the card handling apparatus as well as the bulk of the optical system; an end section 3, secured to the left end of the base section, for housing the xerographic developing apparatus; and a control section 4, mounted on the base section and forward of the upper section, for housing certain of the electrical equipment required in the system and to provide a control panel whereon the operator may set selected ones of a plurality of switches for selecting the desired type of operation.

Base section 1 includes two side frames that are connected across their tops by a plate 5, whereby the entire system is supported. Suitable cover plates are included to enclose the mechanism and access doors are provided on the front of the machine to facilitate repair and adjustment. Upper section 2 includes suitable cover plates for enclosing the bulk of the card handling apparatus and the optical system, as well as a card magazine 7 for holding microfilm cards from which reproductions are to be made, and a receiving magazine 8 to which cards are ejected after the microfilm image thereon is reproduced. Also included, is a lever 9 whereby the optical system may be set selectively for 15× or 20× magnification ratio. In addition, a handwheel is provided whereby the position of the card magazine may be altered relative to the optical system, in accordance with the longitudinal dimension of the image on the microfilm card. End section 3 is enclosed by a dust-tight housing and is pivotally mounted on the base section by suitable hinges 11, whereby the entire end section of the machine may be swung outwardly to permit access to the several elements of the developing system, and to permit convenient access to the surface of the xerographic drum for the purpose of cleaning. The entire structure is specifically arranged to form a light-tight enclosure in the areas of the optical projection system and the xerographic developing system.

Figure 11:
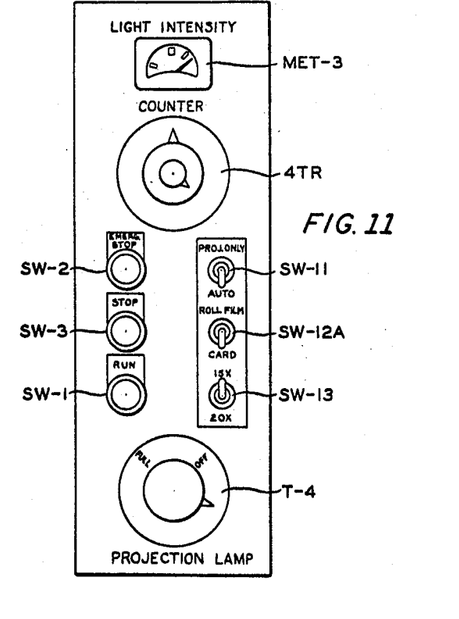
FIG. 11 is an enlarged elevation of the control panel of the xerographic processing system of FIG. 1.

Control section 4 (see also FIG. 11) includes an instrument panel 12 for supporting the several operating controls in convenient reach of the operator. These controls include a variable transformer control T–4, for varying the intensity of the projection lamp of the optical system; a light intensity meter MET–3, which is employed in testing to determine the light intensity reaching the xerographic drum; and an automatic reset-type counter 4–TR, that is pre-settable to the desired number of copies required to be made of any microfilm card image. In addition, the panel includes a "Run" switch SW–1, to initiate the operation of the system; a "Stop" switch SW–3, that functions to stop the machine within a predetermined interval after it is pushed to permit the completion of certain xerographic operations; and an "Emergency Stop" switch SW–2, that is effective to stop the system instantaneously in the event this should become necessary. Also included are switches for selecting the desired type of operation, as follows: A "Projection Only—Automatic" switch SW–11, whereby the entire machine may be run automatically or the upper section or "head" may be operated independently; a "15×–20×" switch SW–12, for selecting the driving rate of the microfilm card carriage; and a "Card-Roll Film" switch SW–12A, whereby the machine may be set to operate from microfilm cards or from roll film, if desired. It may be noted that an understanding of machine operation with roll film is not essential to the present invention and that, therefore, no portion of the roll film mechanism is described herein.

*General description of system*
*(FIG. 2)*

Figure 2:
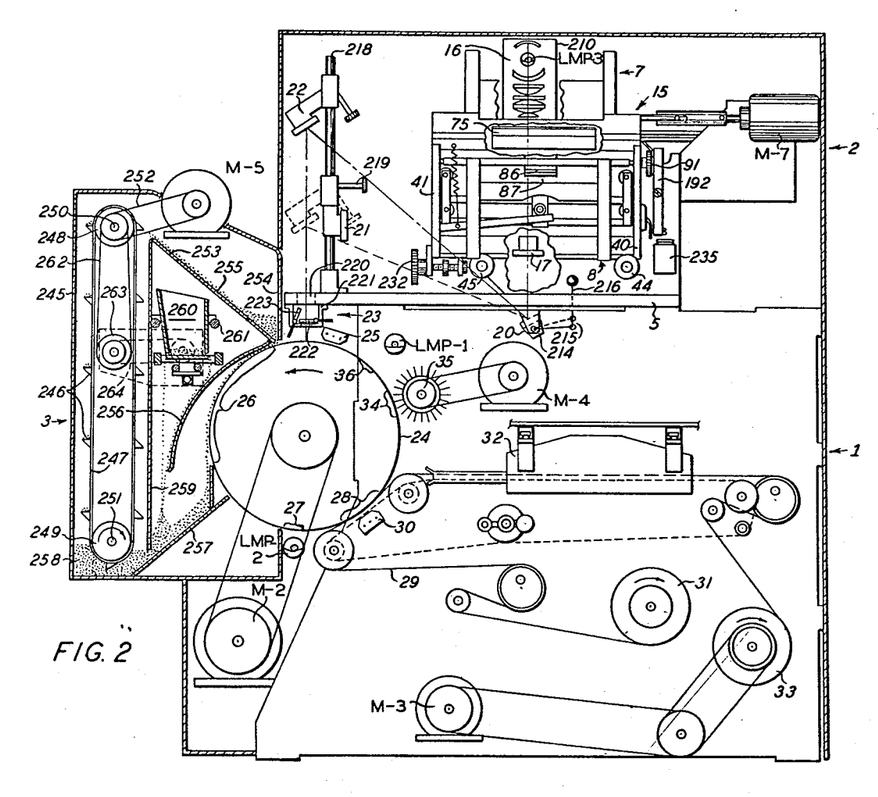
FIG. 2 is a schematic sectional view of a xerographic processing machine containing the apparatus of the invention.

For a general understanding of the xerographic processing system in which the invention is incorporated, reference is had to FIG. 2 in which the various system components are schematically illustrated. As in all xerographic systems based on the concept disclosed in the above-cited Carlson patent, a light image of copy to be reproduced is projected onto the sensitized surface of a xerographic plate to form an electrostatic latent image thereon. Thereafter, the latent image is developed with an oppositely charged developing material to form a xerographic powder image, corresponding to the latent image, on the plate surface. The powder image is then electrostatically transferred to a support surface to which it may be fused by any suitable form of fusing device, whereby the powder image is caused permanently to adhere to the support surface.

In the system disclosed herein, microfilm cards are placed in a card magazine 7 from which they are fed seriatim to a card carriage of a card handling apparatus, generally designated by reference character 15, arranged to the rear of the card magazine assembly. Suitable driving means are provided for the card carriage whereby it is caused to move the card past the optical axis of a projection lens system 16 that is illuminated by a projection lamp LMP-3 for the purpose of scanning the microfilm frame. The microfilm card image is projected downwardly through an adjustable objective lens assembly 17 and then reflected upwardly by an adjustable mirror element 20 to either of two transverse mirror assemblies 21 or 22, in order to vary the length of the optical path, depending on the magnification ratio employed. From mirror assemblies 21 or 22, the light image is projected downwardly through a variable slit aperture assembly 23 and onto the surface of a xerographic plate in the form of a drum 24.

Xerographic drum 24 includes a cylindrical member mounted in suitable bearings in the frame of the machine and is driven in a counterclockwise direction by a motor M-2 at a constant rate that is proportional to the scan rate of the microfilm card, whereby the peripheral rate of the drum surface is identical to the rate of movement of the reflected light image. The drum surface comprises a layer of photoconductive material on a conductive backing that is sensitized prior to exposure by means of a screened corona generating device 25, which may be of the type disclosed in Walkup Patent 2,777,957, that is energized from a suitable high potential source.

The exposure of the drum to the light image discharges the photoconductive layer in the areas struck by light, whereby there remains on the drum a latent electrostatic image in image configuration corresponding to the light image projected from the microfilm card. As the drum surface continues its movement, the electrostatic latent image passes through a developing station 26 in which a two-component developing material, which may be of the type disclosed in Walkup Patent 2,638,416, is cascaded over the drum surface.

After developing, the xerographic powder image passes a discharge station 27 at which the drum surface is illuminated by a lamp LMP-2, whereby residual charges on the non-image areas of the drum surface are completely discharged. Thereafter, the powder image passes through an image transfer station 28 at which the powder image is electrostatically transferred to a support surface web 29 by means of a second corona generating device 30 similar to corona charging device 25, mentioned above.

The support surface to which the powder image is transferred may be of any convenient type and is obtained from a supply roll 31 and is fed over suitable guide and tensioning rolls and directed into surface contact with the drum in the immediate vicinity of transfer corona generating device 30. After transfer, the support surface is separated from the drum surface and guided through a suitable heat fusing apparatus 32, whereby the powder image is permanently affixed to the support surface. Thereafter, the support surface is fed over a further system of guide and tensioning rolls and onto a take-up roll 33 that is driven by motor M-3.

After transfer, the xerographic drum surface passes through a cleaning station 34 at which its surface is brushed by a cleaning brush assembly 35, rotated by a motor M-4, whereby any residual developing material remaining on the drum is removed. Thereafter, the drum surface passes through a second discharge station 36 at which it is illuminated by a fluorescent lamp LMP-1, whereby the drum surface in this region is completely flooded with light to remove any electrostatic charge that may remain thereon. Suitable light traps are provided in the system to prevent any light rays from reaching the drum surface, other than the projected microfilm image, during the period of drum travel immediately prior to sensitization by corona generating device 25 until after the drum surface is completely passed through the developing station 26.

Figure 3:
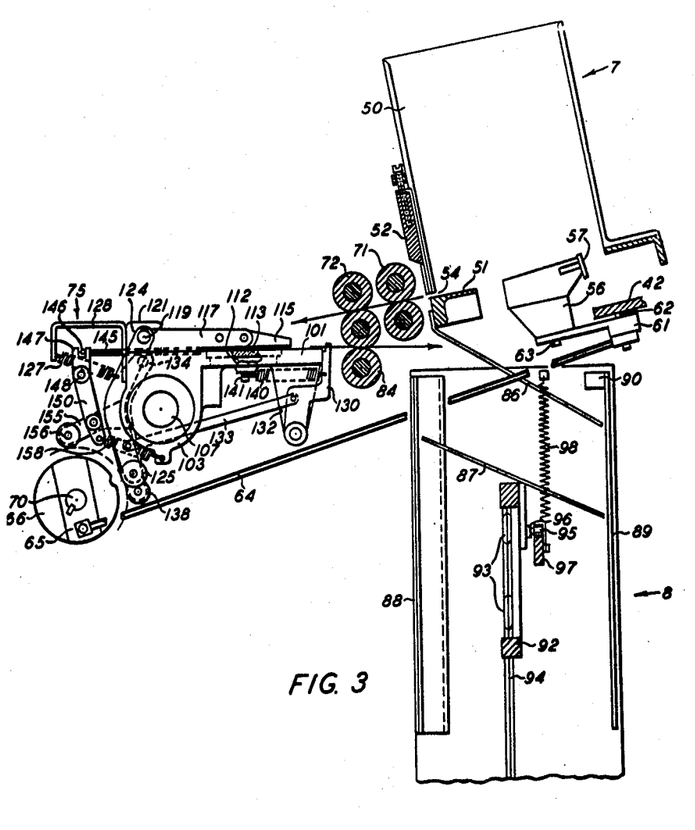
FIG. 3 is a side elevation, partly in section, of the card handling apparatus of the invention.

*Card feeding apparatus (FIGS. 3, 4 and 5)*

The card feeding apparatus comprises the several devices that serve to feed microfilm cards seriatim from card magazine 7 (see FIG. 3) to a card carriage whereby they are moved past an optical system that is effective to project the microfilm image onto the xerographic drum one or more times, in accordance with the number of copies required. After projection of the required number of light images, the card is ejected from the card carriage and is deposited in receiving magazine 8.

Figure 4:
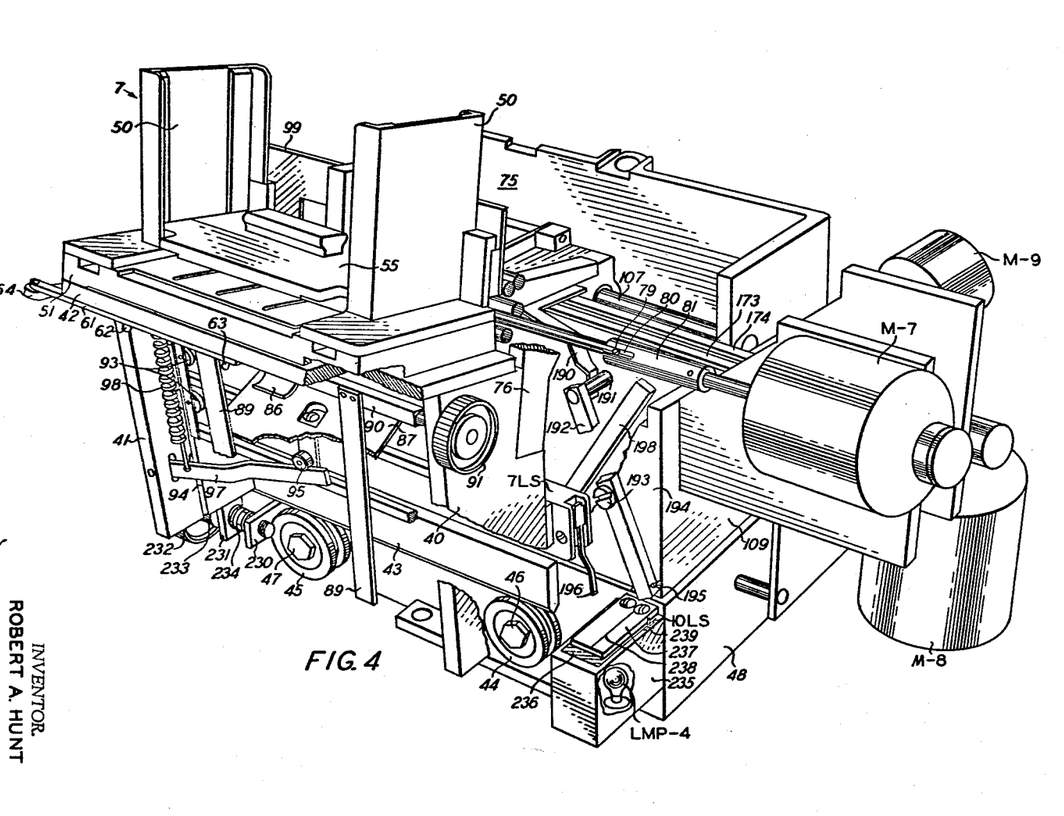
FIG. 4 is a perspective view of the card handling apparatus, as seen from the front of the machine.

For convenience of assembly and adjustment, the card feeding apparatus, as shown in FIG. 4, is mounted on a rigid frame consisting of side plates 40 and 41 and a top plate 42 that is integrally connected with the side plates. Side plates 40 and 41 are also connected at their lower ends by a knife edge member 43 that rides in grooves in rollers 44 and 45 that are rotatably mounted on studs 46 and 47 that are fixed in a base casting 48 that serves to support the entire card handling apparatus and, in turn, is supported on plate 5 of base section 1. By this arrangement the entire weight of the card feeding apparatus is supported by rollers 44 and 45, whereby the entire assembly may be moved laterally, as described below, to adjust the position of the card magazine assembly relative to the card carriage. Suitable guide members (not shown) are provided to maintain the card feeding apparatus in upright position.

Seriatim feeding of the cards is effected by means of an apparatus that is an adaptation of that disclosed in Braun Patent 2,211,094. Microfilm cards are placed in card magazine assembly 7 that includes vertical guide members 50 for holding a stack of cards in alignment, and a base member 51 for supporting the weight of the card stack which, in turn, is supported on frame plate 42. The magazine is arranged to permit the feeding of cards from the bottom of the card stack and an adjustable throat knife assembly 52 is provided at the exit slot 54 of the magazine to retain the remaining cards in the stack as each bottom card is removed. A card weight 55 is provided to hold the cards in proper feeding relation.

For moving each card out of the magazine, the apparatus includes a movable base block 56 that supports the trailing edge of the card stack and is provided with an adjustable pickerknife 57 that is arranged to engage the trailing edge of the lowermost card of the stack. Base block 56 is mounted in suitable ways for sliding movement toward and away from the exit slot of the magazine, and is reciprocated in timed relation to the operation of the remainder of the card handling apparatus. For this purpose, a lever 61 is pivotally mounted on a stud 62 fixed in frame plate 42 and is connected to base block 56 by a shouldered screw 63. The other end of lever 61 is connected to a crank rod 64 which, in turn, is pivotally connected to a crank arm 65 that is adjustably mounted on a detent cam 66 keyed on a cam shaft 70 (see also FIG. 5). As described below, cam shaft 70 is rotated periodically through a single revolution clutch, in timed relation to the remainder of the mechanism, whereby a single card is advanced from card magazine 7, as required.

As each card leaves magazine 7, it is gripped successively by two sets of feed rolls 71 and 72 and advanced rearwardly to a card carriage assembly, generally designated by reference character 75. For this purpose, both sets of feed rolls 71 and 72 are journaled for rotation in supporting brackets 76 and 77 that are secured on side plates 40 and 41, respectively, and the upper rolls are resiliently urged into engagement with the lower rolls by springs 78. For driving the feed rolls, the shaft of lower roll 71 extends through bracket 76 and is provided with a pin 79 that engages a slot 80 in a collar 81 fixed on the drive shaft of a motor M-7 that rotates continuously while the apparatus is in operation. The remaining rolls are positively driven through pinions 82 fixed on each feed roll shaft and an idler pinion 83 mounted on bracket 77, whereby the two upper rolls 71 and 72 are rotated clockwise, as viewed in FIGS. 3 and 5, and lower rolls 71 and 72 are rotated counterclockwise to advance the card to card carriage assembly 75, which at this point of operation is directly aligned with the feed rolls to receive the card.

Immediately thereafter, the card carriage is moved to the right, in a path of movement normal to the card feeding movement, to effect the image scanning operation. After the microfilm image in the card is scanned by the optical system, carriage assembly 75 is returned to a position in alignment with the feed rolls and the card is ejected from the carriage assembly, as described below. Thereupon it is engaged by lower feed roll 72 that is in frictional contact with an idler feed roll 84 that is rotatably mounted in arms 85, that are pivoted on side plates 40 and 41, and is resiliently urged into contact with feed roll 72. The continued driving action of feed roll 72 is thereby effective to move the card forwardly against a deflector plate 86 that causes the card to drop downwardly and come to rest on a support plate 87 in receiving magazine 8.

The receiving magazine includes suitable vertical guide members 88 to confine the movement of the cards rearwardly, and gate members 89 are fixed on a rod 90 that is rotatably mounted in side plates 40 and 41. Gate members 89 are effective to maintain the cards in a vertical stack but may conveniently be swung outwardly by rotating a knob 91 fixed on rod 90, whereby the operator may remove cards from the machine. Support plate 87 of the magazine is secured on a rectangular frame assembly 92 having rollers 93 that ride in vertical grooves 94 in side plates 40 and 41, whereby support plate 87 is guided for vertical movement. A roller 95 is mounted on a stud 96 fixed in frame assembly 92 and rides on a lever 97 that is pivotally mounted in side plate 41. Spring 98 is extended between lever 97 and the magazine frame to urge frame assembly 92 and support plate 87 upwardly, when there are no cards in the magazine. This construction minimizes the possibility of cards tumbling as they are ejected from the card carriage and, at the same time, provides a support plate structure that moves downwardly as additional cards are added, against the tension of spring 98, whereby a substantial number of cards may be stacked in the receiving magazine before it is necessary for the operator to remove them.

In the event of a misfeed of a card or in the event the supply of cards in card magazine 7 becomes exhausted, means are provided to stop the machine to enable the operator to make the necessary adjustments. For this purpose, a "card detector switch" 6-LS (see FIG. 5) is mounted on the back plate 99 of card magazine 7. This switch functions in conjunction with the remainder of the electrical circuit to keep the several operating circuits energized as long as switch 6-LS is actuated during the period in which a card is supported to be passed through feed rolls 71 and 72. For this purpose, a switch-actuating element 100 extends downwardly between the upper feed rolls 71 and 72 and into the path of movement of the cards. Engagement of each card with actuating element 100 serves to maintain the desired circuitry energized. In the event there is a failure to feed a card, switch 6-LS is not actuated and the circuit is thereby broken to stop the machine, as described below.

*Card carriage assembly and controls*
*(FIGS. 3, 5 and 6)*

The card carriage assembly received each microfilm card from the feed rolls and carries it through the scanning cycle, i.e., the "scan" or exposure stroke and the return stroke, during continuous operation of the machine. In the normal stopping position of the system, the card carriage 75 is positioned at the end of its scan stroke of movement, in which it is out of register with the card magazine assembly 7. When the system is restarted, card carriage 75 is immediately returned to a position in register with feed rolls 71 and 72 of the card magazine assembly to receive the next card for reproduction. The carriage is held momentarily in this position to permit the ejection of a card carried thereby, if any, and to receive a new card. During the scanning cycle and the card changing cycle, the card carriage and its several related operating mechanisms function to effect the several mechanical movements and electrical circuit connections of the card handling operation in proper sequence.

Specifically, card carriage assembly 75 includes a card carriage 101 (see FIGS. 5 and 6) that is formed of a casting having a flat top surface or platen for supporting cards and a longitudinal bore 102 extending through two downwardly depending bosses 103 and 104 in which are inserted linear ball bushings 105 and 106 whereby the carriage is adapted for lateral movement, relative to the card magazine assembly, on a shaft 107 that is fixed in frame plates 108 and 109 secured on base plate 48. To maintain the carriage horizontal, it is provided with a roller (not shown) that is mounted on its underside at an axis at right angles to shaft 101 and that rides on a rail (not shown) that is arranged parallel to shaft 107. By this structure, carriage 101 is supported for movement on shaft 107 while maintaining its card supporting surface in a substantially horizontal position throughout its path of movement.

For guiding microfilm cards onto the carriage platen, card guides 110 and 111 are provided at opposite ends of the carriage. In order to project a light image from a microfilm card supported on the carriage, a rectangular aperture 112 (see FIG. 3) is formed through carriage 101. Aperture 112 is of a dimension slightly in excess of that of a microfilm frame held in a card, and is positioned to underlie the microfilm frame when the card is positioned on the carriage. An optical glass insert 113 is positioned in aperture 112 to provide a flat surface for supporting the microfilm frame.

For clamping the microfilm frame of a card in scanning position, there is provided a spring loaded, rectangular frame or pressure pad 115 (see FIG. 6) having an optical flat 116 secured therein and projecting slightly from the underside thereof, whereby, when frame 115 is positioned on a card held on the carriage, optical flat 116 securely presses the microfilm frame against insert 113 in the carriage so that the microfilm frame is securely pressed in a horizontal plane during the scanning operation.

In order to actuate pressure pad 115 to permit the insertion and removal of microfilm cards, the pad is fixed to two arms 117 and 118 that are pinned on a shaft 119 that is rotatably journaled in bosses 120 and 121 on carriage 101. Also fixed on shaft 119 is another arm 122 that is connected by a bail rod 123 to arm 118, whereby the remaining portion of the card is held substantially flat on the carriage.

Figures 8, 9:
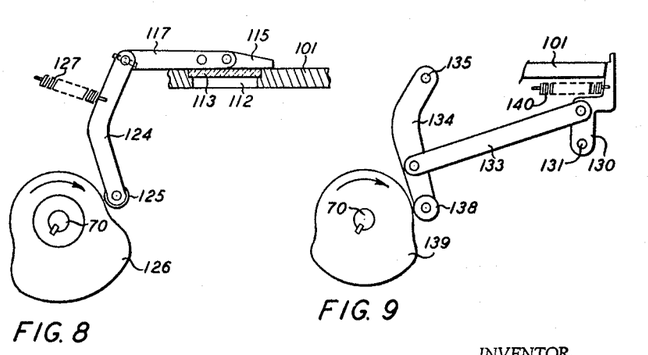

For operating pressure pad 115, a crank 124 (see also FIG. 8) is fixed on shaft 119 and is provided with a follower 125 at its lower end that is adapted to be engaged by the high dwell of a cam 126 fixed on cam shaft 70 which, as described below, is rotated through a single revolution by means of a single revolution clutch drive during each card feeding operation. The rigid crank assembly comprising pressure pad 115, arms 117 and 118, and crank 124 are resiliently urged clockwise by a spring 127 extended between crank 124 and the outer edge of a bracket 128 fixed on boss 121. The several parts of this assembly are so proportioned that they are limited in motion by contact between pad 115 and the carriage surface so that follower 125 is held slightly away from the low dwell of cam 126 at this stage of operation.

For properly positioning a card on carriage 101 after it is fed thereto, the apparatus includes two line-up fingers 130 (see also FIG. 9), together with their actuating linkages. Each of the fingers 130 is in the form of an offset lever that is pivotally mounted on a stud 131 secured in a boss 132 on the underside of the carriage. A forked link 133 connects the midportion of each finger 130 to a follower arm 134 that is pivotally mounted on a stud 135 journaled in bosses 136 and 137 formed on the carriage. A follower 138 is rotatably mounted on the lower end of lever 134 and is adapted to engage the high dwell of a cam 139 that is also fixed on cam shaft 70. A spring 140 is extended between a stud 141 and the upper portion of each finger 130 and functions to urge each finger against the forward edge of carriage 101 and to urge follower 138 into contact with cam 139. However, the dimensions of the parts are such that contact between the fingers and the carriage limits the rearward movement of follower 138 to a position in which a slight clearance is maintained between it and the lower dwell of cam 139. In operation, fingers 130 are rocked clockwise (in FIG. 9) immediately prior to the time a card is fed from feed rolls 72 so that the card has unimpeded passageway onto the card carriage. The high dwell of cam 139 is such that when a card is completely passed over fingers 130, the fingers are restored to the position shown by spring 140 and serve to urge the card rearwardly to place it accurately in scanning position.

Figure 6:
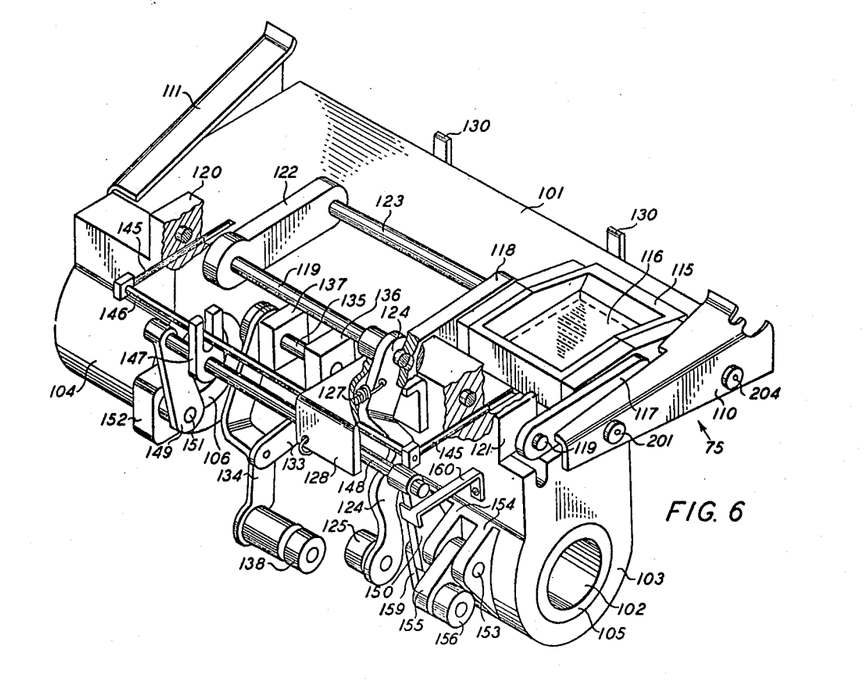
FIG. 6 is an isometric view of the card carriage.
Figure 7:
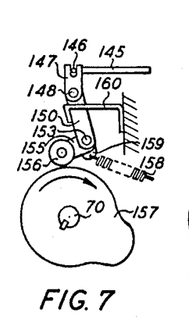
FIGS. 7, 8, and 9 are schematic sectional elevations, respectively, of the card ejecting, card holding, and card guiding mechanisms of the card handling apparatus.

For ejecting a card during a card changing cycle, two ejector rods 145 (see also FIG. 7) are slidably journaled in bores drilled through bosses 120 and 121 and extending for a slight distance onto the upper surface of carriage 101. Ejector rods 145 are normally held in their rearward position, as in FIG. 6, and are provided with squared forward ends that engage the rearward edge of a card positioned on the carriage. The rearward ends of rods 145 are connected to a transverse rod 146 that extends between the arms of a bifurcated crank 147 that is fixed on a rod 148 which, in turn, is fixed at each end to crank arms 149 and 150. Crank arm 149 is pivotally mounted on a stud 151 in a boss 152 on the carriage. Crank arm 150 is fixed on a stud shaft 153 that is journaled in bosses 154 on the carriage and is rigidly connected to a crank arm 155 having a follower roller 156 that is adapted to engage the high dwell of a card ejector cam 157 fixed on cam shaft 70. A spring 158, extended between the underside of boss 103 and a downward extension 159 on crank 150, serves to rotate the crank assembly counterclockwise to draw ejector rods 145 to their rearward position and to urge follower roller 156 against the low dwell of cam 157. However, a bracket 160 secured on the carriage limits the movement of the crank assembly to maintain follower roller 156 slightly out of contact with cam 157. When roller 156 is actuated by the high dwell of cam 157, the crank assembly is rocked clockwise to cause ejector rods 145 to eject a card from the carriage and into the ejector rolls of receiving magazine assembly 8.

For operating the several cam controlled mechanisms of card carriage assembly 75 as well as the card feeding mechanism, there is provided a motor M–8 that is supported by base casting 48 and is connected to cam shaft 70 through a gear reduction assembly 165 and a conventional solenoid actuated, single revolution clutch 166, whereby the several mechanisms are caused to function in timed relation to the remainder of the mechanism. Motor M–8 is driven continuously and is effective to drive cam shaft 70 through a single revolution upon the energization of a solenoid SOL–3, as described below. When this occurs it is apparent from the cam contours shown in FIGS. 7, 8 and 9 that line-up fingers 130 are first rocked clockwise to remove them from the path of movement of the card. Immediately thereafter, pressure pad 115 is elevated to release the card, if any, held on carriage 101. Thereupon, ejector rods 145 are effective to eject the card from the magazine and are immediately withdrawn to their rearward positions. At this point, crank 65 is effective to cause a new card to be advanced through feed rolls 71 and 72, and onto the card carriage. Immediately thereafter, fingers 130 are rocked counterclockwise to position the card accurately on the carriage. As this is acomplished, pressure pad 115 is lowered to press the microfilm frame into register with the scanning aperture in the carriage. During the rotation of cam shaft 70, detent cam 66 is effective: first, at about its midpoint of revolution, to actuate a "miss detector" switch 5–LS that functions in conjunction with "card detector" switch 6–LS to stop the system in the event of a misfeed; and second, immediately before the end of its rotational movement, to actuate an "end of cycle" switch 9–LS that functions to condition the related circuits for a scanning cycle of operation, as described below.

*Card carriage drive (FIGS. 4, 5 and 10)*

Figure 10:
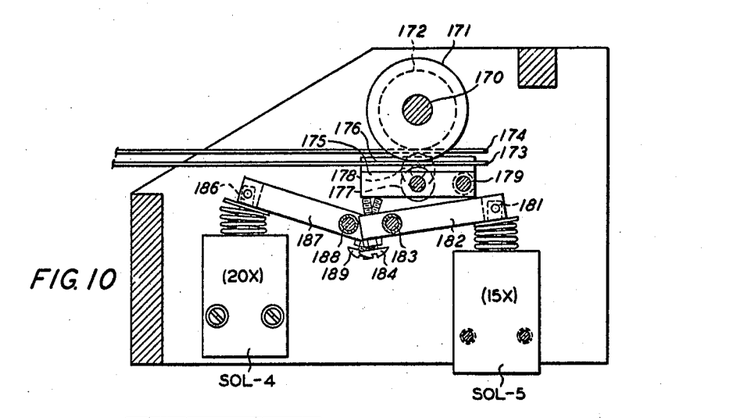
FIG. 10 is a sectional view of the card carriage drive mechanism.

For driving card carriage assembly 75 during the scanning operation, there is provided a driving arrangement for moving the carriage at different speeds during the "scan stroke," in accordance with the particular magnification ratio that is to be employed. For this purpose, there is provided a motor M–9 (see FIGS. 4 and 5) that is suitably secured in the frame of the machine and is provided with a drive shaft 170 having two rollers of different dimension fixed thereon, i.e., a roller 171 to effect 15×drive rate, and a roller 172 to effect 20×drive rate. Associated with rollers 171 and 172 are drive rods 173 and 174, respectively, each of which is of substantially rectangular cross-section and is secured to the right-hand end of carriage assembly 75. In the arrangement employed, as illustrated in FIG. 10, each of the drive rods 173 and 174 is spaced slightly from its associated drive roller and rests on an associated pinch roller 175 and 176, respectively, each of which is mounted on a substantially horizontal bar member 177 and 178, respectively, that are pivotally mounted on a stud 179.

In operation, motor M–9 rotates continuously but is effective to drive carriage assembly 75 only at selected intervals because of the spacing between drive rods 173 and 174 and their respective drive rolls 171 and 172. To effect engagement of drive rod 171 and drive roll 173 there is provided a "15×" solenoid SOL–5 that is mounted in the frame of the machine and has its armature 181 connected to a lever 182 that is pivotally mounted on a stud 183 secured in the machine frame. At the opposite end of lever 182 there is provided an adjustable screw 184 that is set substantially in engagement with the lower face of bar 175. Similarly, there is provided a "20×" solenoid SOL–4 which, through its armature 186, actuates a lever 187 pivoted on a stud 188 and is provided with an adjustable screw 189 that contacts the lower face of bar 178.

When the machine is to be set for a 15×magnification ratio, the operator adjusts switch SW–13 (see FIG. 11) accordingly, whereby 15×solenoid SOL–5 is connected in the carriage assembly drive circuit. When the carriage is to be operated, solenoid SOL–5 is energized, as described below, to rotate lever 182 clockwise and drive bar 175 clockwise to cause roller 177 to force drive rod 173 into frictional engagement with drive roll 171. Similarly, when 20×magnification ratio is desired, 20×solenoid SOL–4 is energized to rotate lever 187 counterclockwise about pivot 188 and drive bar 176 clockwise to cause roller 178 to move drive rod 174 upwardly into frictional engagement with drive roll 172. By proper selection of the drive roll diameters, different driving ratios are obtained whereby, in each instance, carriage assembly 75 is driven past the axis of the optical system at a rate directly proportional to the rotational speed of the xerographic drum in order to achieve exact synchronism between the moving light image of the microfilm frame and the sensitized surface of the xerographic drum, in accordance with the magnification ratio desired.

Figure 5:
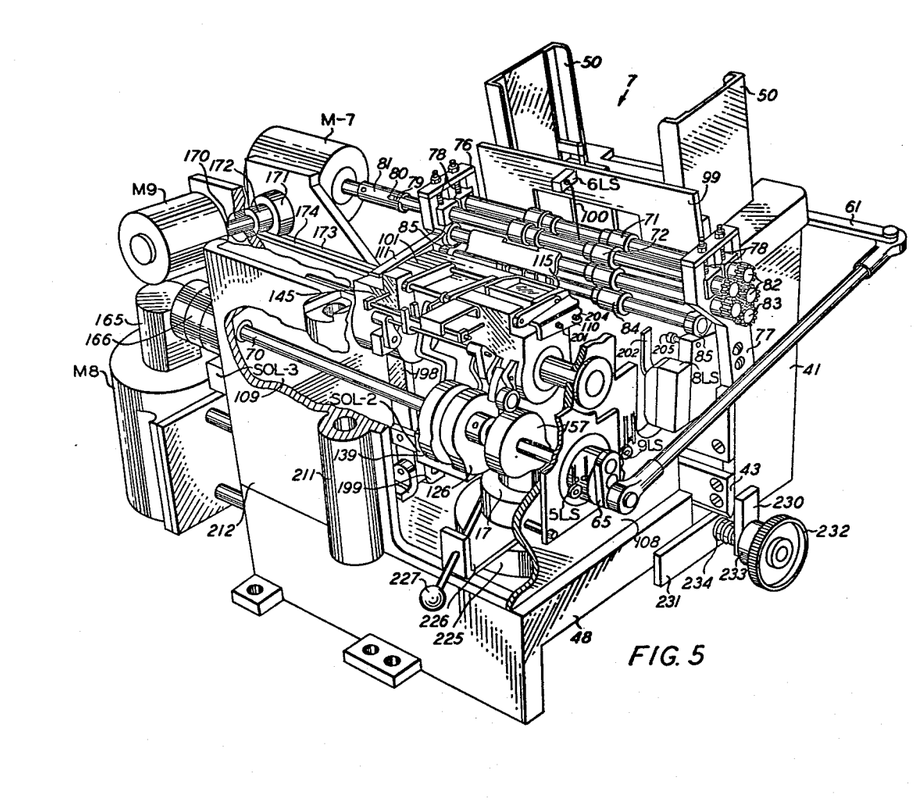
FIG. 5 is a perspective view of the card handling apparatus, as seen from the rear of the machine.

For driving the card carriage during the return stroke of the scanning operation, there is provided a solenoid-actuated restoring mechanism to effect substantially instantaneous return of the carriage and thereby minimize loss of time between scanning strokes. This circuit is energized when the carriage assembly 75 reaches its "end of scan" position, as shown in FIG. 5, and remains energized for a brief period after the carriage is returned to its "start of scan" position, as shown in FIG. 4.

As carriage assembly 75 moves to the right from its start of scan position (FIG. 4), an offset, pendant finger 190 fixed on the carriage bears against a stud 191 in a lever 192 that is pivotally mounted on a shoulder stud 193 that is fixed in a frame plate 194. Continued movement of the carriage rotates lever 192 about its pivot until an adjustable pin 195 in the lower end of the lever contacts the actuating element 196 of an "end of scan" limit switch 7-LS that is fixed on the rearward edge of frame plate 40 of the card feeding assembly. The closing of switch 7-LS is effective to complete a circuit to energize a carriage return solenoid SOL-2 (see FIG. 5) that is fixed in the frame of the machine and has its armature connected to a lever 198 that is pivotally mounted on brackets 199 fixed on base plate 48. The upper end of lever 198 is aligned with pin 191 on lever 192 whereby, upon energization of solenoid SOL-2, lever 198 is rocked counterclockwise and is effective to rock lever 192 counterclockwise to cause pin 191 to press against finger 190 and restore the carriage assembly 75 to its "start of scan" position.

As carriage assembly 75 approaches its "start of scan" position, a first bumper element 201 (see FIGS. 5 and 6) on card guide 110 engages an actuating element 202 on an "end of scan" limit switch 8-LS that is fixed on a plate member 203 that is secured to the inner face of frame plate 41 of the card feeding assembly. Substantially simultaneously, a second bumper element 204 engages a fixed limit stop 205 that is set in plate 203. The actuation of switch 8-LS signals the return of carriage assembly 75 to its "start of scan" position and is effective, after a short delay, to initiate a repeat scan of the card on the card carriage or to effect the ejection of that card and the feeding of a new card, in accordance with the condition of the associated circuits. The slight delay period effected by switch 8-LS serves to maintain carriage return solenoid SOL-2 energized briefly to maintain pressure on the carriage, via lever 198, pin 191, and finger 190, in order to damp out oscillations of the carriage that may occur when it hits limit stop 205.

Thus, there is provided a driving mechanism for moving carriage assembly 75 throughout the scanning cycle of operation. Throughout this cycle, cam shaft 70 remains in the position shown in FIGURE 5 in which followers 125, 138 and 156 of the carriage assembly actuating mechanism are opposite the low dwells of their respective cams 126, 139 and 157. Inasmuch as a slight clearance is provided between each follower and the low dwell of its respective cam, as described above, the several followers may conveniently be removed from alignment with their respective cams and then returned to proper alignment therewith during the movement of the carriage assembly, without the possibility of interference.

*Card feed-optical system adjustment (FIGS. 4 and 5)*

Although the aperture in microfilm cards currently in commercial use are constant in size, the actual usable image area varies in accordance with the size of the original and the reduction ratio used in making the microfilm frame. For all practical purposes, the maximum length of the image in a microfilm card is defined by the size of the opening in the adhesive used to secure the film to the card. This dimension is usually 1⅝". On this basis the xerographic reproducing system disclosed herein is designed to accommodate film widths up to 1¾", and the amount of carriage assembly travel during the scanning stroke is limited accordingly. When the longest length of scan is used, a portion of the microfilm image at either end is covered by the relatively transparent adhesive that secures the microfilm frame to the card, thereby resulting in some loss of image quality in the extreme ends of the frame. However, this permits the use of larger images when that is required.

When a large number of images is to be reproduced that are less than the full size of the average or normal card aperture, it is desirable to reduce the length of the scan to correspond to the overall length of the microfilm image in order to minimize wastage of transfer material and in order to reduce the time required for making the reproductions. In the present system it is possible to vary the length of scan in accordance with the length of the microfilm image by moving the entire card feeding assembly relative to the axis of the optical system.

The waste space between successive prints on a web of transfer material is determined by the amount of time required to effect a carriage return and card change, or, in the case of a repeat scan, the time required to return the carriage and restore the scan drive. By returning the carriage in the manner described above, it is possible to restore the carriage and condition it to initiate a repeat scan stroke in approximately ⅛ of a second. Inasmuch as the xerographic drum and transfer material web are traveling at a rate of 20 feet per minute, this results in a space between prints of approximately ½". When a card change is required in addition to the carriage return, an additional ¼ second is required so that the total waste space on the transfer material in this condition amounts to approximately 1½". Although these figures are obviously well within the limits of operating convenience, it is apparent that it is highly desirable to reduce scan time and waste of transfer material whenever possible by decreasing the length of the scanning stroke.

As a matter of practice, all microfilm frames employed in making microfilm cards are positioned in a manner to center the microfilm image within the microfilm card aperture. For this reason, any change in the start of scan position requires a corresponding change in the end of scan position. By means of the arrangements thus far disclosed, it is possible to adjust both the start of scan and the end of scan positions by means of a single manual setting.

As pointed out above, when carriage assembly 75 is returned to its start of scan position, it is stopped by a limit stop 205 that is mounted on a plate 203 fixed on card feeding assembly frame plate 41. Thus, the starting position of the carriage varies in accordance with changes in the position of the card feeding assembly. In addition, the end of scan switch 7-LS is mounted on the card feeding assembly and moves therewith. Since this movement is in the opposite direction to that required, the invention includes the particular arrangement of lever 192 whereby a center pivot 193 is introduced between switch 7-LS and finger 190 on carriage assembly 75 in order to reverse the motion. By this means, as the start of scan position is altered, a corresponding change in end of scan position occurs.

In adjusting the scan length it is necessary for the operator to know where to position the card feeding assembly for the particular film to be used. For this purpose there are provided a viewing device to enable the operator visually to observe directly on the microfilm frame the length of scan for which the apparatus is set, and means manually to adjust the position of the card feeding assembly, and thereby the start of scan position, relative to the optical axis.

For adjusting the position of the card feeding assembly relative to the axis of the optical system, frame plate 41 (FIGS. 4 and 5) of the card feeding assembly is provided with a pendant extension secured thereto that has a hole in its lower end. In addition, a lateral extension 231 is secured on base plate 48 and is provided with a tapped hole aligned with the hole in member 230. An adjusting screw 232 is threaded into member 231 and is provided with an enlarged shoulder portion 233 that bears against member 230. A compression spring 234 is arranged on the shank of screw 232 between members 230 and 231. By the combined action of screw 232 and spring 234, the entire card feeding assembly can be moved laterally, with respect to the axis of the optical system, by adjusting the position of knife edge member 43 on rollers 44 and 45. By this means, the start of scan position and end of scan position may be adjusted at will.

In order to determine precisely the amount of adjustment required for any given card or set of cards, a card image viewing device 235 (see FIG. 4) is secured on base plate 48 in spaced relation to the outer face of frame plate 40 of the card feeding assembly. The viewing device includes a light box having a glass top 236 and a transparent guide plate 237 spaced sufficiently therefrom to permit the insertion of a microfilm card between the glass top and the guide plate. An index line 238 is engraved on the underside of guide plate 237. A microswitch actuating element 239 is arranged to be operated by a card placed in viewing position to close a microswitch 10–LS to complete a circuit to a lamp LMP-4 within the viewing device, to facilitate visual observation of the microfilm frame.

In use, a microfilm card is inserted under guide plate 237 and is pushed against the outer face of frame plate 40 of the card feeding assembly. The several parts are so arranged that the point at which index line 238 intersects the microfilm frame in the card aperture defines one end of the scan travel and, since the image is centered in the card aperture, defines the area to be scanned. To set the mechanism for the proper scan length, the edge of the card is held against plate 40 and screw 232 is rotated to move the card feed assembly until index line 238 is positioned on the microfilm frame at the point at which it is desired to start scanning the image thereon. When this adjustment is made, the card used for the adjustment and others having a similar image area may be reproduced with a minimum waste of transfer material and a maximum utilization of available scanning time.

*Operation of the card handling mechanism*

The function of the card handling mechanism is to position each individual card in the optical path, pass it at the proper speed past the lens, return it for the desired number of repeat copies, if required, and, finally, to reject the card and position the following card. During scan each card lies in a horizontal plane and the light source projects a light beam vertically downward onto the microfilm image and then downward through the lens onto a mirror positioned below the lens, at which point the beam is deflected upward, at an angle determined by the magnification selected, onto one of two mirrors, which then reverses the beam and projects it vertically downward onto the xerographic drum.

In the description to follow it is assumed that the manual switches will be set to Head Automatic, Card, and 15×. The operation of the xerographic portion of the system is considered only when it is necessary to an understanding of the card handling mechanism.

For simplicity of description it is assumed that the machine is already in operation, with a card on the carriage being scanned. Operation during the starting period is described below.

Figure 12:
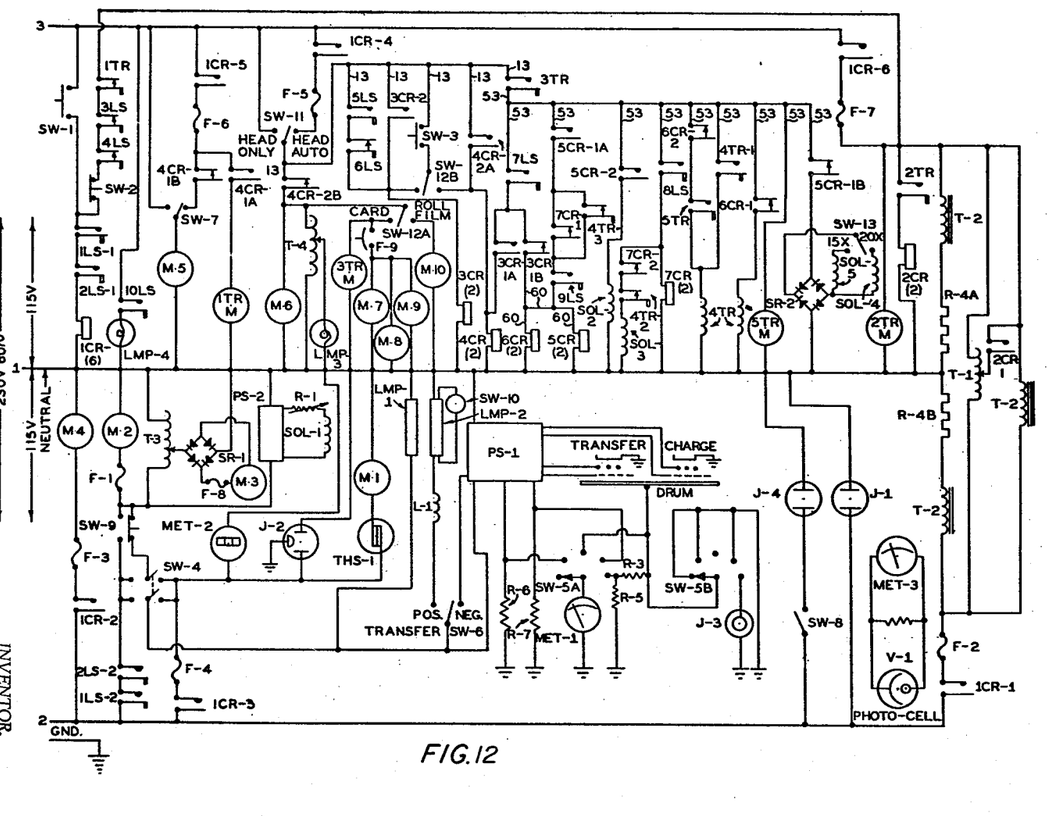
FIG. 12 is a wiring diagram.
Figure 13:
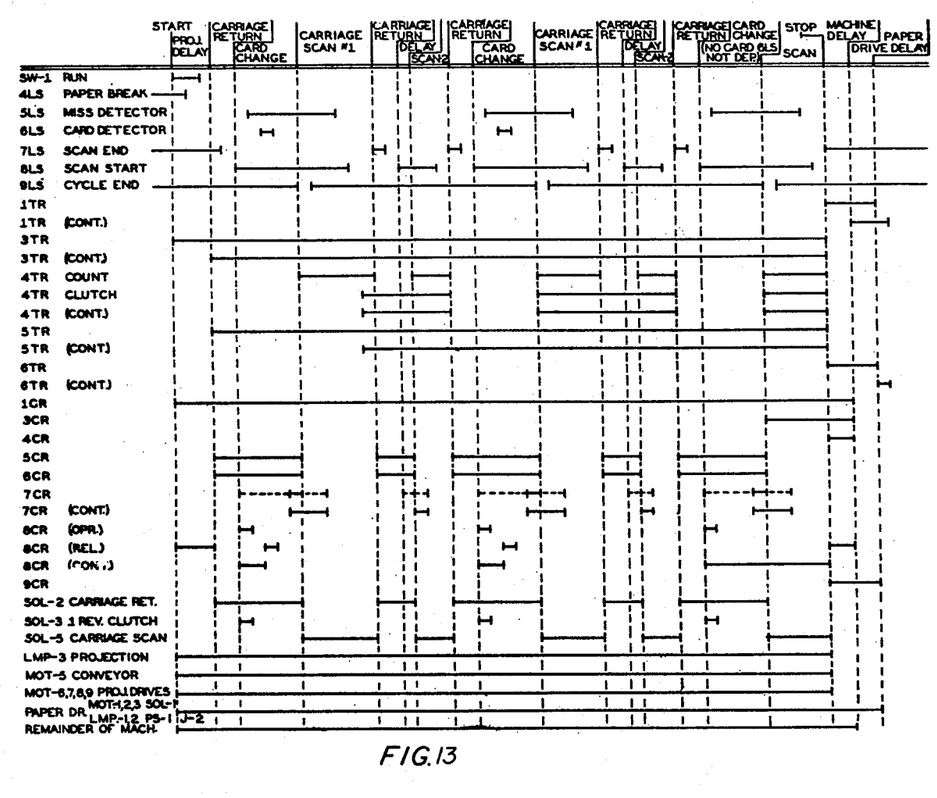
FIG. 13 is a timing diagram.

For card operation, the following components operate continuously: the projection lamp, the lamp cooling blower, the card feed roll drive motor, the scan drive motor, and the cam shaft drive motor. Referring to the wiring and timing diagrams, during the scanning operation solenoid SOL–5 the 15× scan drive solenoid is energized and the carriage is driven at constant speed by the 15× scan drive roller. At the end of the scan the finger on the carriage operates the end of scan switch (7–LS). When 7–LS closes at the end of scan, power from wire 53 is fed through the normally closed contact of relay 3CR to wire 60. Wire 53 is energized at all times during the operation of the head, and serves as a power source for the relays and solenoids in the control section.

It is assumed that the counter is set to produce more than one copy, and in the case being considered the counter has not reached a total count. With power applied applied to wire 60, relays 5CR and 6CR are energized. Relay 5CR, the carriage return relay, is maintained after its initial operation through contact 5CR–1A. Contact 5CR–1B interrupts the circuit to solenoid SOL–5, which releases the friction drive to the carriage to permit its return without interference with the scan drive. Contact 5CR–2 closes and energizes solenoid SOL–2, the carriage return solenoid. This solenoid then operates and returns the carriage to the start scan position in approximately ⅛ of a second.

As soon as the carriage starts its return movement, SW7–LS again opens. However, relays 6CR and 5CR remain operated through contact 5CR–1A. The counter coils 4TR count, and 4TR clutch have been energized continuously during scan through the normally closed contacts of 6CR. On the operation of relay 6CR contact 6CR–1 and 6CR–2 open the circuit to the counter coils and a count is registered by the counter. The counter operation is such that a count is registered each time the circuit to the coil is interrupted, rather than when the coil is energized.

The operation of the counter is as follows: When power is first applied to the coils of the counter, the clutch coil operates the contacts of the counter, closing contact 4TR–1 and opening contacts 4TR–2 and 4TR–3. When power is removed from the coils a single count is registered by the count coil. The clutch coil is maintained continuously by the closed contact 4TR–1. Each succeeding application and removal of power to the coils registers an additional count until the full number of counts has been achieved. Upon removal of power after the final count the clutch coil is de-energized by the counter mechanism, and contact 4TR–1 opens and contacts 4TR–2 and 4TR–3 close. Thus, contacts 4TR–2 and 4TR–3 are closed only during the interval from the removal of power on the final count of a cycle to the application of power on the next count.

Since a card repeat is being considered in this example, the operation of relay 6CR results in a count being registered by the counter upon the opening of contact 6CR–1. Contact 6CR–2, although it opens at this time, has no effect since contact 4TR–1 is closed.

When the carriage reaches the start scan position SW8–LS is operated by the carriage. Relay 7CR then operates. Relay 7CR is adjusted so that it requires 30 to 40 milliseconds to operate, providing a slight time delay between the time when the carriage returns and the relay contacts open. By means of this delay the carriage return solenoid continues to apply force against the carriage when it strikes the stop at the start scan position to minimize the tendency of the carriage to bounce away from the stop due to the impact.

When relay 7CR operates contact 7CR–1 opens, and the circuit to relays 5CR and 6CR is interrupted, releasing both relays. Contacts 7CR–2 has no effect at this time, since contact 4TR–2 is open. When relay 5CR releases contact 5CR–1A opens, and the relay will not again operate when 7CR–1 again closes. Solenoid SOL–2, the carriage return solenoid, is de-energized by the opening of contact 5CR–2, and the scan drive solenoid is energized by the closing of contact 5CR–1B and the scanning operation is again resumed. Contacts 6CR–1 and 6CR–2 close upon the release of relay 6CR, and power is again applied to the 4TR count coil.

Assume now that the counter has reached a full count, and a card change is to take place. At the end of scan, SW7–LS closes, applying power to relays 5CR and 6CR. Relay 5CR operates and holds through contact 5CR–1A. Contact 5CR–1B opens and interrupts power to the scan drive solenoid. Contact 5CR–2 closes and applies power to the carriage return solenoid and the carriage is returned to the start scan position. Relay 6CR operates and contacts 6CR–1 and 6CR–2 open. The final count is registered and clutch coil 4TR is de-energized, contact 4TR–1 opens and contact 4TR–2 and 4TR–3 close.

When the carriage reaches the start of scan position, SW8–LS is closed and power is applied to relay 7CR and also to the single revolution clutch solenoid, solenoid SOL–3, through contacts 7CR–2 and 4TR–2, both of which are now closed. Solenoid SOL–3 operates and releases the trip lever of the single revolution clutch, and the cam shaft begins a revolution. After a 30 millisecond delay, contact 7CR–1 opens. Since it is now shunted by closed contacts 4TR–3 there is no effect. Contact 7CR–2 also opens, and interrupts the circuit to solenoid SOL–3. The solenoid is de-energized, and the trip lever returns to its normal position. The cam shaft will continue to revolve but will be interrupted at the end of one revolution by the stop lever. Since the opening of contacts 7CR–1 did not interrupt the hold circuit for relays 5CR and 6CR, the carriage return solenoid continues to hold the carriage against the stop, assuring its proper location with respect to the feeder, so that a card may be fed to the carriage.

As the cam shaft revolves, the line-up fingers are depressed below the carriage level, by their actuating cam; the pressure pad is raised from the carriage to release pressure and permit card movement; and the ejector pins move forward to push the card on the carriage into the mating lower feed rolls, where it is ejected into the card receiver. Simultaneously the picker-knife crank operates the pickerknife, pushing the bottom card of the stack into contact with the upper feed rolls and the card is carried through the rolls and deposited on the carriage. The ejector pins are retracted before the card arrives on the carriage, so there is no interference. The line-up fingers swing back into position to position the card against the back edge of the carriage. Side positioning is accomplished by fixed side flanges on the carriage. The pressure pad now moves downward to clamp the microfilm to the glass insert in the carriage, to insure film flatness during the scan stroke.

As the card passes through the upper card feed rolls it operates the card detector switch, 6–LS, opening the contact. Simultaneously the miss detector switch 5–LS is contacted by the pickerknife crank cam, and contacts 5–LS are closed. Assuming that a card is fed at the proper time, operation will continue. If a card fails to feed, either due to mechanical difficulties, or lack of cards, the card detector switch will not operate, and the miss detector switch on closing will then apply power to relay 3CR, which initiates the stop cycle, described below. Near the end of the cam shaft's revolution, switch 9–LS is operated. This switch, which is normally closed, will then be opened and the entire circuit for relays 5CR and 6CR will be interrupted. The opening of contact 5CR–1A prevents reoperation of the relays. Contact 5CR–2 opens and solenoid SOL–2 is de-energized. Contact 5CR–1B closes and solenoid SOL–5 is energized and scan drive is again resumed.

The normal stopping operation is arranged to ensure delivery of completely fused prints of all material exposed up until the time of the stop. During card operation, provision is also made to provide a complete print of the last image regardless of when the stop operation is initiated. When the stop switch SW–3 is depressed momentarily, power is applied to relay 3CR. Contact 3CR–2 closes, and the circuit is maintained. Contact 3CR–1A now closes and contact 3CR–1B opens. At the end of scan, "end of scan" switch 7–LS closes, and power is now applied to relay 4CR. Relay 4CR operates, and contact 4CR–2A closes and maintains the circuit. Contact 4CR–2B opens, removing power from the projection lamp and the 4 motors.

Operation of the card handling mechanism is now stopped, but the xerographic portion of the machine continues to operate. Contact 4CR–1A closes, upon the operation of 4CR, and timer 1TR is energized. Contact 4CR–1B opens and the conveyor drive motor, motor 5, is stopped. Sufficient developer is maintained in the upper chamber of the developer conveyor to provide developer flow for a sufficient time to develop the exposed section of the drum which remains. When the developer supply is fully depleted the cleaning brush continues to operate, so that the drum will be clean by the time the machine stops. After approximately 18 seconds of operation, TR1 opens a circuit to the main contactor and the remainder of the machine comes to a stop.

When the machine is started with SW–11 in the "head automatic" position, power is applied to wire 13 by the closing of contact 1CR–4, immediately upon depressing the run button. Since contact 4CR–2B is normally closed, power is immediately applied to the projection lamp and the fan, card, clutch, and scan motors. Power is also applied to timer 3TR, and after a delay of approximately 1½ seconds contact 3TR closes applying power to wire 53. If the machine has been stopped through the use of the normal stop procedure, the carriage will be at the end of scan position and SW–7LS will be closed. Since the counter is de-energized at this time contacts 4TR–2 and 4TR–3 are closed, and therefore, a card change will take place immediately. Timer 5TR has been provided to open the circuit to the 4TR clutch coil until the first card change has taken place to prevent the possibility of a brief pulse reaching the clutch coil before relay 6CR operates. After closing, 5TR remains closed continuously during operation. When contact 3TR closes on starting, power from wire 53 is applied through SW–7LS to wire 60, and the operation is as described above for a card change operation.

If the operator wishes to make copies of the card on the carriage, rather than feeding in a new card on starting, he can do so by manually moving the carriage to the start scan position before depressing the run button. If this is done, scanning will start on the closing on contact 3TR, and a full count cycle will be completed before a card change take place. This type of operation would be necessary if the machine were to be stopped before a full number of copies had been made, when making multiple copies. The counter has no provision for storing a partial count, and returns to the start of a count cycle when the machine is stopped. If, for example, the counter were set to produce 10 copies of each print and the machine were to be stopped after only 5 copies had been made, the final set of prints would be short by that amount if the normal starting procedure were followed.

For carrying out service work on the head SW–11 has been provided which permits operation of the head without operation of the xerographic portion. When this switch is thrown to the "head only" position, operation of the head is the same as in the "head automatic" position, and the normal stop switch is to be used for stopping the operation. After the head stops it is necessary to return the switch to the center "off" position to remove power from the stop relays. This switch must be returned to the "off" position in order to restart the operation of the head in the "head only" position. It is, of course, necessary to return this switch to the "head automatic" position at the completion of the service operation to achieve full normal automatic operation.

To switch the operation of the head from one magnification ratio to the other, four operations are necessary. Manually operated toggle switch SW–13 is thrown to the desired magnification ratio, as indicated, connecting the proper scan drive solenoid for use. The lower pivoting mirror is moved from one position to the other by means of a knob on the top plate of the head. The large lower mirror is moved into and out of position by means of a pull knob projecting from the head covers. The lens focus is adjusted by moving the lever to the appropriate position.

Particular features of the developing system, optical system and the fusing apparatus are described in detail in copending application S.N. 776,848, filed November 28, 1958, in the name of Robert A. Hunt, now abandoned.

Since many changes could be made in the above construction and many apparently widely different embodiments of this invention could be made without departing from the scope thereof, it is intended that all matter contained in the drawings shall be interpreted as illustrative and not in a limiting sense.

What is claimed is:

1. In a record card utilization apparatus the combination of
    a card carriage containing
        support means for a record card,
        an aperture in the support means positioned to be aligned with microfilm mounted in a record card,
        positioning guides to locate a record card on the support means with the microfilm aligned with aperture in the support means,
        and a pressure pad positioned adjacent the support means and mounted to be moved against the support means to hold a record card in position on the support means, said pressure pad containing a flat transparent portion in alignment with the aperture in the support means to hold the microfilm flat for optical scanning,
    means for feeding record cards seriatim to the card carriage,
    and means to reciprocate the card carriage normally to the path of movement of the record card feeding means.

2. In a record card utilization apparatus wherein a record card containing a microfilm image is optically scanned, the combination of a card carriage containing
    support means for a record card,
    an aperture in the support means,
    and positioning guides to locate a record card on the support means with the microfilm aligned with the aperture in the support means,
    means for feeding record cards seriatim to the card carriage,
    means to reciprocate the card carriage from a card feeding position through an optical scanning station and back to the card feeding position, the path of movement of said card carriage being normal to the path of movement of the record card feeding means,
    and means to eject a record card from the card carriage after return of the card carriage to the card feeding position.

3. In a record card utilization apparatus wherein a record card containing a microfilm image is moved through a path and is optically scanned the combination of:
    a card carriage including a record card support means having an aperture of a size at least as large as the microfilm images to be scanned and positioning guides to locate record cards on the support means in a position with the microfilm images aligned in the aperture,
    the card carriage being movable normal to the path of movement of the record cards, between a card receiving station in the path of movement of the record card wherein record cards are fed seriatim onto the support means and a microfilm scanning station offset normally to the path of movement of the record cards for scanning of the microfilm images aligned in the aperture of the support means,
    and means to reciprocate the card carriage between the card receiving station and the scanning station.

References Cited by the Examiner
UNITED STATES PATENTS

| | | | |
|---|---|---|---|
| 386,440 | 7/88 | Swift | 271—14 X |
| 1,074,720 | 10/13 | Honigmann | 271—4 |
| 1,373,187 | 3/21 | Freeman. | |
| 1,477,920 | 12/23 | Stewart. | |
| 2,020,027 | 11/35 | Gore | 270—58 |
| 2,108,799 | 2/38 | Davidson | 271—4 |
| 2,988,356 | 6/61 | Maier | 271—4 |

SAMUEL F. COLEMAN, *Acting Primary Examiner.*

ROBERT A. LEIGHEY, RAPHAEL M. LUPO, WILLIAM B. LA BORDE, *Examiners.*